United States Patent [19]
Camp

[11] 3,807,266
[45] Apr. 30, 1974

[54] SLICING MACHINE FOR FRUITS, VEGETABLES AND THE LIKE

[75] Inventor: Clarence W. Camp, Burlington, Vt.

[73] Assignee: Edlund Company, Inc., Burlington, Vt.

[22] Filed: Apr. 27, 1972

[21] Appl. No.: 248,040

[52] U.S. Cl.............. 83/404.4, 83/425.3, 83/431, 83/620
[51] Int. Cl............................................ B26d 7/06
[58] Field of Search............ 83/404.4, 425.2, 425.3, 83/431, 427, 433, 620, 651

[56] References Cited
UNITED STATES PATENTS
| | | | |
|---|---|---|---|
| 2,076,296 | 4/1937 | Debus | 83/431 |
| 1,935,996 | 11/1933 | Rohwedder | 83/431 |
| 3,245,447 | 4/1966 | Jones | 83/425.2 X |
| 2,420,930 | 5/1947 | Bush | 83/431 |
| 269,835 | 1/1883 | Depuy et al. | 83/425.2 |

Primary Examiner—Willie G. Abercrombie
Attorney, Agent, or Firm—Kemon, Palmer & Estabrook

[57] ABSTRACT

A machine for slicing fruits, vegetables and the like having a pair of cutting blade holders arranged to reciprocate towards and away from one another. The holders are provided with inclined surfaces for supporting the cutting blades in spaced parallel relation to one another with said blades receiving the item to be sliced. A guide member mounted upon a pivotally supported lever is configured to engage the item to be severed and force same against the reciprocating blade members to cause said blade members to sever said item into a plurality of slices of uniform thickness throughout.

4 Claims, 7 Drawing Figures

SLICING MACHINE FOR FRUITS, VEGETABLES AND THE LIKE

BACKGROUND OF THE INVENTION

The present invention is directed to a machine or apparatus for cutting or slicing vegetables and fruits wherein a pair of blade holders are reciprocally driven by means of a motor in order to slice said food product.

The fruit and vegetable slicing machines or devices most commonly known and used are either the ones wherein an item is held against movement while a suitable cutter of the reciprocating or pivotly mounted type engages said item for cutting one slice at a time or the machine or device which is designed to cut an item into a plurality of slices in a single operation. The first type of machine is usually incapable of producing a plurality of slices of uniform thickness throughout as the majority of said machines do not contain a feed mechanism which would be capable of actively feeding towards the cutter the item to be sliced. Thus the resultant slices would vary as to thickness and size and definitely would not be of uniform thickness throughout the entire slicing operation.

The second type of machine while capable of producing a multiplicity of slices in one operation, is not in a majority of instances capable of producing uniform slices throughout. In many machines of the prior art, the blade members are arranged so as to be susceptible to a flexing bowing action which results in uneven slicing so that certain slices may be relatively thin while adjacent slices, from the same item, are relatively thick. On the other hand the same slice can vary from top to bottom as to its thicknesses as the blades tend to flex or bow while being forced through the item that is being sliced. The slicing of certain types of dense products, like turnips, carrots and onions by machines of the prior art has resulted in adjacent blade elements being bowed or flexed in such a manner that non-uniform slices are produced during the same cutting operation. The slicing machines as typified by the prior art have usually experienced difficulty in cutting or slicing dense products as the continuous reciprocating sawing operation of the cutter elements in moving through said area of the fruit or vegetable usually results in cutters being flexed, bowed or bent so as to have slices of varying thickness and ones which have the appearance of being torn or shredded. This type of operation usually results in an unnecessary waste of the food product so that such a cutting or slicing machine when used in a commercial establishment usually produces an undesirable non-uniform slice that results in an increase in the cost of operation of said establishment.

SUMMARY OF THE INVENTION

The present invention is directed to a slicing machine for fruits, vegetables and the like wherein a pair of blade holders are reciprocally driven with respect to one another by means of a suitable motor. Any food product that is susceptible of being cut or sliced with a knife can be readily sliced with a machine of the present invention and this is particularly true with respect to the slicing or cutting of the so-called dense food products such as onions, turnips and carrots wherein the resultant slices are of uniform thickness throughout. The cutting blades are uniquely arranged in the blade holder members in an inwardly inclined step-wise pattern so that there are only two blades, out of a plurality of blades, that have their cutting edges in the same cutting position or plane at any one time. This unique arrangement of the cutting blades results in the food item being more or less centered in the cutting blade holder members so that said food item is engaged by a first pair of cutting blades and then an additional pair of cutting blades. Thus the food item is cut in a somewhat step-wise manner which is determined by the outer configuration or contour of the food item being sliced.

The food item being cut or sliced by the machine of the present invention is engaged on lower or bottom side or surface thereof by the blade members in the reciprocating blade holders and on the opposite or top side or surface by a plurality of positioning and guiding elements or fingers. The guiding fingers or elements are carried by a pivotally mounted lever member with said fingers being shaped or configured to engage said food item and force same against said cutting blades while at the same time tending to act as guide elements for the cutting blade.

Figure 1:
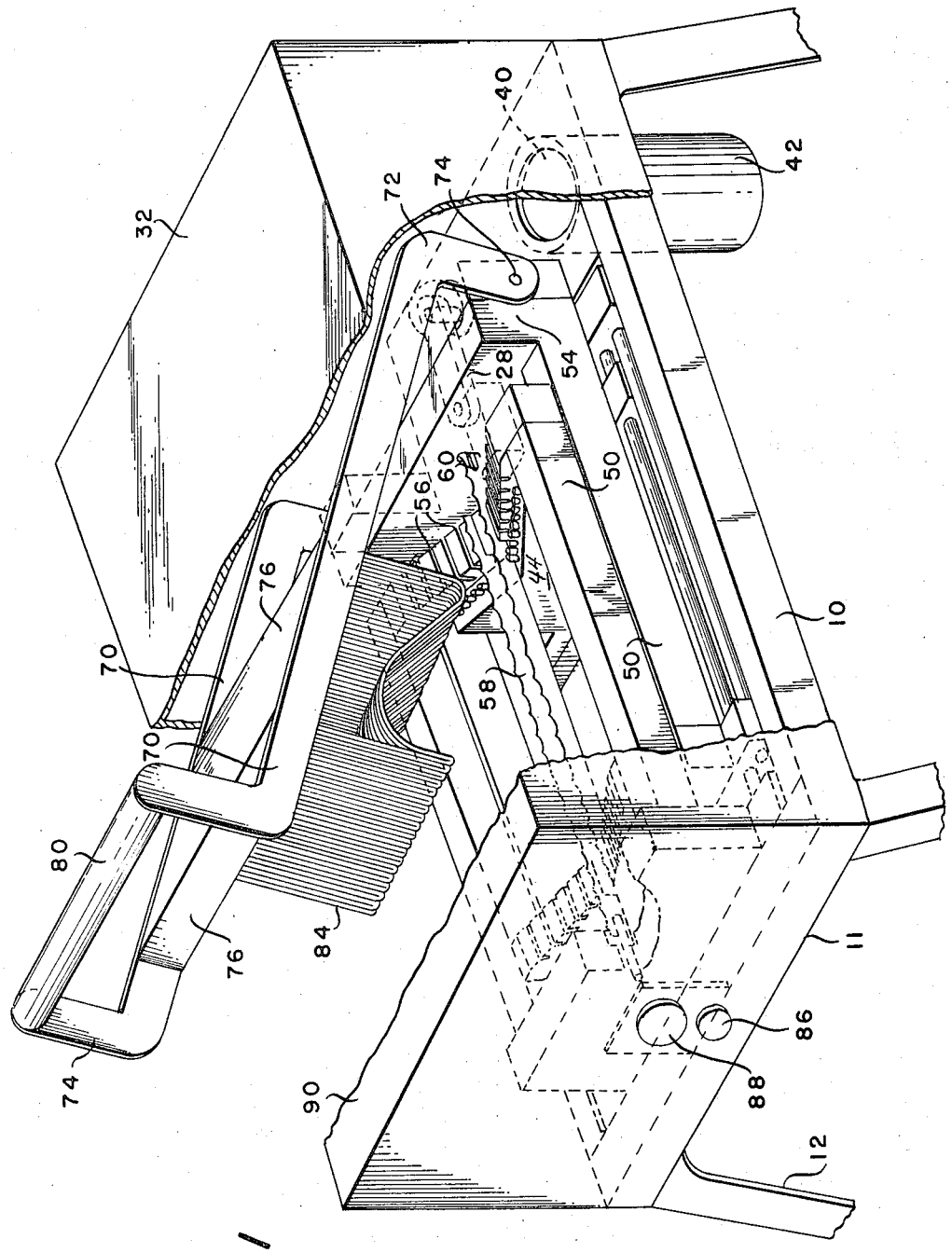
FIG. 1 is a perspective view of the food slicing machine of the present invention with part of the outer covering on housing removed and with certain portions being shown in section for purposes of illustration.
Figure 2:
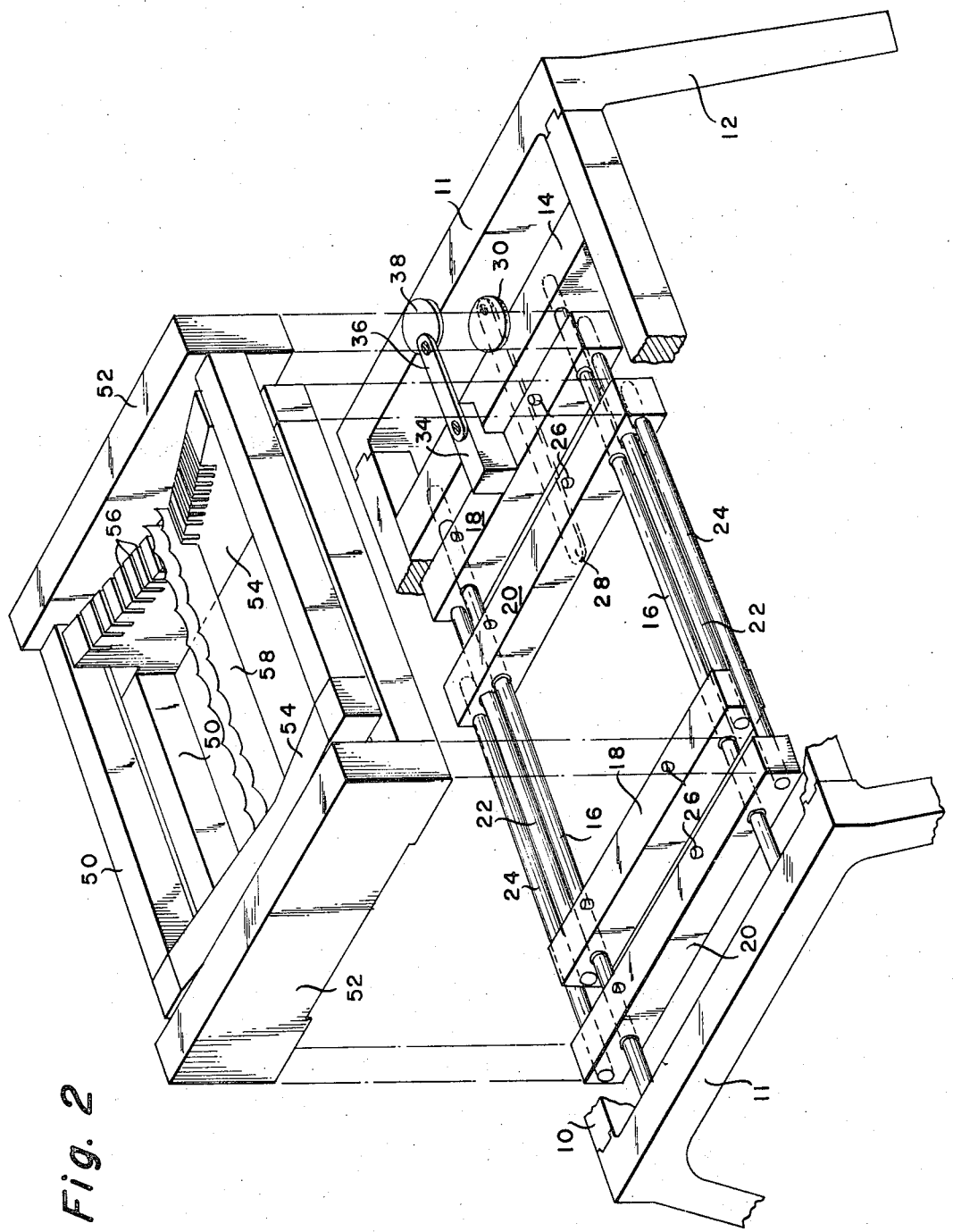
FIG. 2 is an exploded view of a portion of the food slicing machine as shown in FIG. 1 with certain parts thereof being deleted and others shown in section in the interest of clarity.

There is shown in FIGS. 1 and 2 a rectangularly shaped frame structure consisting of side members 10 connected to end members 11 which are provided with suitable legs 12. One end portion of the frame structure is provided with a transverse support or bracing member 14 that is rigidly secured to the side members 10 in spaced parallel relation to one of the end members 11. The support member 14 and the remote end member 11 each have mounted therein the ends of a pair of support rods 16 that are arranged in spaced parallel relation with one another and with the side members 10. The rods 16 have slidably mounted thereon a plurality of bars 18 and 20. The bars 18 are of a shorter length than the bars 20 and said bars 18 are maintained in spaced parallel relation with one another by means of tie rods 22 which have their ends secured to the outer end portions of the bars 18. Thus the bars 18 are assembled as a set and are capable of reciprocating in the manner of a carriage on the support rods 16. It is to be noted that the tie rods 22 extend through suitable opens provided adjacent the ends of one of the bars 20 so that said set of bars 18 have one of the bars 20 interposed therebetween. In a like manner, the bars 20 are connected together in spaced parallel relation by tie rods 24 which are disposed outwardly of one of the bars 18 as shown in FIG. 2. Thus the bars 20 are assembled as a set and reciprocate in the manner of a carriage on the support rods 16.

The upper surface of each of the bars 18 and 20 has provided thereon a pair of spaced vertically extending mounting pins 26 while the lower surface of the bar 20 nearest the bracing member 14 has connected thereto one end of a link or arm 28. The link 28 extends under the bar 18 and beneath the support or bracing member 14 and has a cam element 30 suitably connected to the free end thereof within an end closing or housing structure 32 that is supported upon the bracing member 14 and the adjacent end member 11. The bar member 18 that is positioned adjacent the bracing member 14 has secured to its upper face thereof a block element 34 which has one end of a link or arm 36 connected thereto with the free end of said link or arm having a cam element 38 connected thereto. The link 36 and cam element 38 are disposed within the housing structure 32 in the same manner as the cam 30. The end frame 11 and bracing member 14 have mounted thereon in a depending relationship a conventional drive unit 40 which has associated therewith a depending motor 42. The drive unit is designed to drive the cam elements 30 and 38 by suitable gear mounts, not shown. The cam element 30 is positioned 180° out of phase with respect to the cam element 38 so that upon energization of the motor 42, the drive unit 40 will be driven thereby so as effect the rotation of the cam elements 30 and 38 which will result in a reciprocatory movement being imparted to the links 28 and 36 which movement in turn will be imparted to the carriage elements or bars 18 and 20. The carriage units being connected to the cam elements 30 and 38 by the links 26 and 36 said units will have a resultant movement of towards and away from one another.

Figure 6:
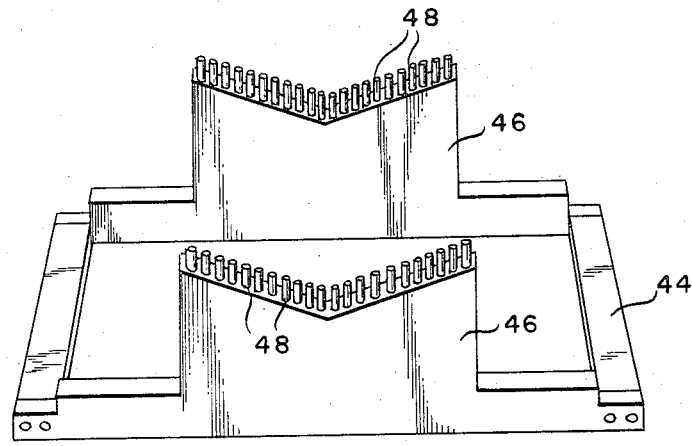
FIG. 6 is a perspective view of the guide plate member of the present invention.

A cutter blade guidance frame 44 is shown in FIG. 6, and, consists of a rectangular shaped base portion formed with a pair of diametrically disposed vertically extending plate members 46. The uppermost edge or face of each of the plate members 46 is formed with an inclined or inwardly sloping surface so that said edge or face is in the form of a V. The inclined surface of the plate members 46 has mounted therein a plurality of vertically extending pins 48 which are equally spaced from one another with the pins of one plate member being in aligned relation with the pins in the other plate member. The guidance frame 44 is secured to the side frame members 10 in such a manner that the plate members 46 are positioned between the inner most bars 18 and 20 of the reciprocating carriage structure, FIG. 1.

Figure 3:
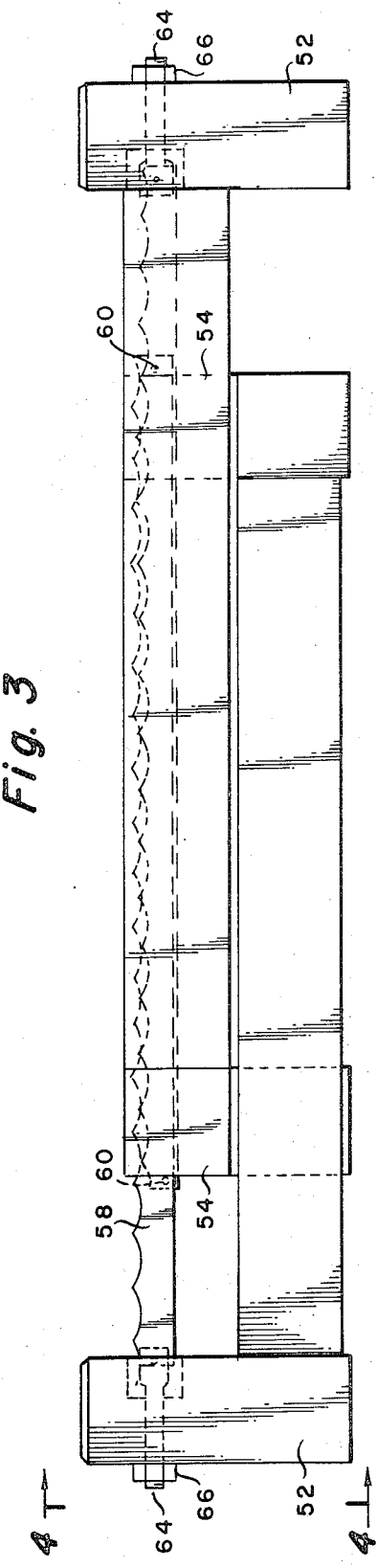
FIG. 3 is a side elevational view of the reciprocating blade holders showing a blade mounted therein.
Figure 5:
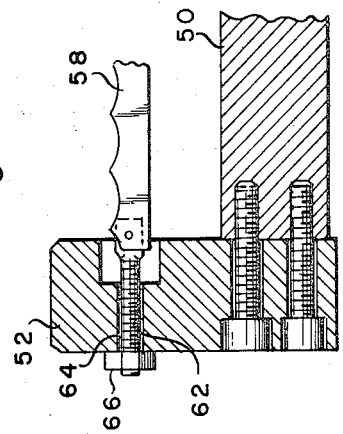
FIG. 5 is a detailed sectional view of an end of one of the blade holders, the view being taken on the line 5—5 of FIG. 4.
Figure 4:
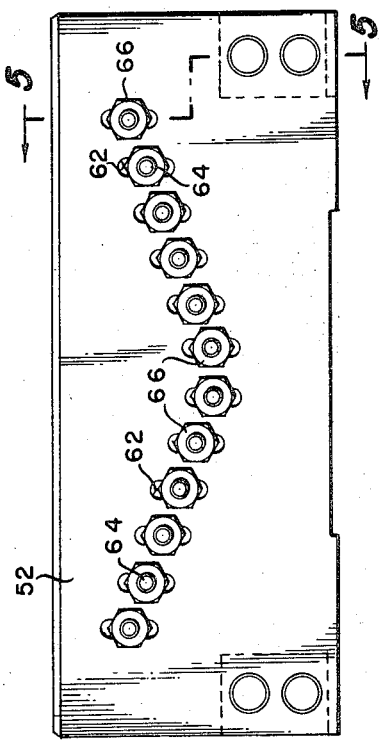
FIG. 4 is an end view of one of the blade holders shown in FIG. 3, the view being taken on the plane 4—4 of FIG. 3.

A cutting or severing blade holder or carrier, FIG. 2, consists of a pair of rectangularly shaped frame members 50 each of which is provided with an enlarged end member 52. It is to be noted that in one of the frame members the end 52 has its greater portion projecting above the side portions of the frame member while the other frame member 50 has the end with the greater portion thereof projecting below the side portions. In this arrangement the lower or bottom surface of each of the end members 52 lies in the same horizontal plane. The two frame members are assembled one upon the other for reciprocatory movement with respect to one another illustrated in FIGS. 1 and 2. The frame members 50 are each provided with an end 54 that is remote from the end 52 and which end has its upper face or surface sloping or inclined inwardly from the outer edge towards the center portion thereof so as to assume a V-shape that tends to correspond to the shape or configuration of the upper surface of the plate members 46 of the guide frame structure 44. The upper inclined or sloping face of each end member 54 is provided with a plurality of spaced slots 56, FIGS. 1 and 3, which are adapted to receive an end portion of a cutting blade 58. The cutting blades 58 have a stop pin 60, FIG. 3 provided in an end thereof that are designed to engage the outer surface of the end member 54 to limit the movement of the cutting blade in one direction when positioned in the slots 56 of the cutting blade holder. The end members 52 of the frames 50 are each provided with a plurality of spaced apertures or slots 62, FIGS. 5 and 6, that are arranged in an inclined or inwardly sloping manner so as to resemble the letter V and are in alignment with the slots 56 formed in the ends 54 of the frame members 60. The cutting blades 58 each terminate in a threaded rod or stem 64 that is designed to extend through the slot or opening 62 provided in the end member 52 and same are secured in place by suitable nuts 66. The cutting blades 58 are provided with an undulating or saw like surface and the degree of tension to which said blades are retained within the frame members 50 is determined by the nuts 66 being threaded upon the ends of the rods or stem members 64. The frame members 50 with the cutting or severing blades 58 affixed in the ends 52 and 54 are mounted upon the reciprocating carriage structures with the pins 26 of the bar elements 18 and 20 projecting into suitable recess or sockets, not shown, provided in bottom faces or surfaces of the ends 52 and 54 of the frame members 50. Thus, upon the actuation of the links 28 and 36 by means of the cam elements 30 and 38, the reciprocatory movement of the carriage structures is transmitted to the frame members 50 so that said frame members with the cutting or severing blades mounted in the ends 52 and 54 will have a reciprocatory action with respect to one another. This movement will result in the blades carried by one of the frame members moving in one direction while the blades carried by the end members of the other frame member will move in the opposite direction and then said movement will be reversed and the frame members will then tend to move each in the opposite direction.

The bracing member 14 interposed between the side frame members 10 and adjacent one of the end frame member 11 is provided with a pair of vertically disposed support pillars or posts 68, FIG. 2, which constitute a base element upon which an actuating element or lever structure is pivotly mounted. The actuating element includes a pair of spaced arms 70, FIG. 1, which terminate in angularly projecting end portions 72 that are pivotally secured to the post 68 by means of suitable pins 74. The arms 70 intermediate their ends are provided with a pair of transverse bracing members 76 while the free ends of said arms terminate in upwardly projecting portions 78 to which a transversely extending handle member 80 is secured by any suitable means. The bracing members 76 of the actuating lever 70 are designed to receive and support a food product positioning and guiding device which consists of a rectangular base member 82, FIG. 8, that has depending therefrom a plurality of spaced finger elements 84 whose central or mid-portion is of an inclined or arcuate configuration, FIG. 1.

Figure 7:
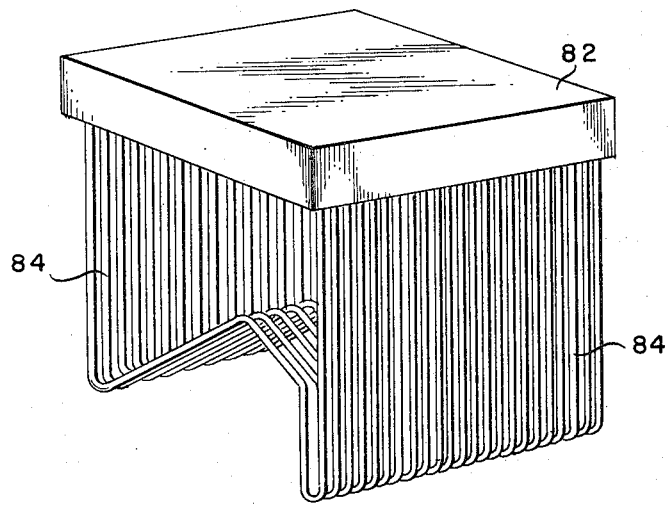
FIG. 7 is a perspective view of the finger guide elements of the present invention.

The finger elements 84 cover an area or span that approximates the spacing between the plate members 46 of the guidance frame 44, FIG. 7, so that when the handle 80 of the actuating levers is manually depressed towards the frame members 10, the finger elements 84 will move towards the cutters 58 and between the plate members 46. In addition, the finger elements 84, as they are manually moved downwardly towards the frame members 10, will pass between adjacent cutting blades 58 and thus serve as additional guide elements or support for said cutting blades. This additional guidance or support that is afforded to the cutting blades by the finger elements 84 tends to assure that said cutting blades will not flex or bow during the cutting operation. Thus as the finger elements engage the food product or item to be cut - sliced and gradually forces same into engagement with the cutting blades whereby said cutting blades will gradually move through the food product the forward and rearward portions of the finger elements 84 will move between adjacent cutting blades and afford or provide additional support and guidance to said reciprocating cutting blades. The pins 48 of the plate members 46 provide the initial support and guidance for the reciprocating cutting blades and as the food product or item is sliced and moving between and through the cutting blades the finger elements 84 will start to move between adjacent cutting blades and thus provide for additional support and guidance for said blades. A suitable cover 90, FIG. 1, cooperates with the housing member 32 that is carried by the bracing member 14 to substantially enclose the greater portion of the reciprocating carriage elements and the cutting blade frame members. The only portion of the machine which is then in an open condition is the area wherein the good product or item that is to be cut or severed is placed upon the cutting blades or knives and which is engaged by the fingers elements 84 of the actuating levers 70.

In the use of the slicing machine, the frame members 50 with the cutting blades mounted therein are positioned upon the bars 18 and 20 of the reciprocating carriage structures and the cover for the machine is placed in the position as illustrated in FIG. 1 while the finger elements 84 mounted upon the actuating levers 70. The item to be cut or sliced is placed by the operator using one hand for this operation upon the cutting blades 58 within the area defined by the plate members 46 of the cutter blade guidance frame 44 and then the starter switch 86 is actuated to energize the motor 42 which will result in the gear train 40 being driven whereby the cams 30 and 38 will be actuated to cause a reciprocatory motion being imparted to the carriage structure so as to cause the cutter blades 58 to move in a reciprocating manner. The handle 80 of the actuating element or levers 70 is grasped by the other hand of the operator and moved about the pins 74 in the supports 68 so as to initially move said lever 70 towards the frame members 10. The movement of the actuating elements or levers 70 is restricted by a safety switch, not shown that is mounted within the housing structures carried on the bracing member 14. It then becomes encumbent upon the operator to use the hand that placed the item to be cut upon the cutting blades to actuate the safety switch release button 88, FIG. 1, to permit the elements or levers 70 to be moved downwardly towards the frame member 10. In this manner both hands of the operator are required to operate the machine which will tend to avoid accidents. As the lever elements 70 are moved towards the frame member 10, the finger elements 84 will engage within the inclined or arcuate portion thereof, the surface of the item to be sliced and pressure is thus applied to said item through the movement of the actuating elements or levers 70 which causes said item to be moved into engagement with the reciprocating cutting blades 58. The continued downward movement of the actuating elements or levers 70 will result in the food item being forced downwardly against said reciprocating cutting blades causing the blades to move through said item and to slice or cut same so that the finished slice product will be discharged into a suitable receptable placed beneath the frame members 10.

The inclined shape of the upper surface of the end members 54 of the cutting frame structure results in the cutting blades 58 being arranged in a step formation with the blades at the outer edge portion of the end members 54 being at a higher point than the blades in the central portion of the end members 54. Thus, we find that there are only two blades or only two cutting edges that are in the same cutting position or cutting plane at any one time and this holds true as the item being cut is gradually forced into engagement by the finger elements 84 as they are moved downwardly toward the frame members 10. This arrangement of the cutting blades is analoguous to having said cutting blades in a staggered position from one side of the machine to the opposite side and said arrangement eliminates any tendency of the cutting blades to flex or bow and thereby eliminates the problem of displacing the sliced products in an accumulative horizontal plane which causes cutting blade distortion as well as excessive blade loading and which results in uneven product slices. The use of the cutter blade guidance frame 44 with the plate members 46 having the pins 48 positioned on the upper surface or edge thereof when taken in conjunction with the reciprocating cutter blade frame members 50 being arranged in overlapping positions with respect to one another and designed to move in a reciprocatory manner within a limited area tends to insure that the cutting blades will be free from any flexing or bowing in as much as there will not be any great area of cutting blade exposed to the item that is being cut which is not being assisted in maintaining its true and correct position and alignment. The pins 48 and the plate members 46 definitely act as guide elements to the reciprocating cutting blades and the spacing between the plate members 46 determines the area or spacing that is utilized for slicing or cutting the food product. In addition, to the foregoing, the finger elements 84 as they move downwardly towards the cutting blades 58 will pass between adjacent or contiguous cutting blades and in turn will act as guide members to assist the pins 48 and the plate members 46 in guiding the cutting blades during their reciprocatory travel, thereby assuring that the food product being sliced will produce uniform slices and thus avoid the producing of uneven slices and slices which vary in thickness throughout.

Although the foregoing description is necessarily of a detailed character, in order that the invention may be completely set forth, it is to be understood that the spe-

I claim:

1. A slicing machine for fruits, vegtables and the like comprising a frame, a pair of support members mounted in said frame in spaced parallel relation to one another, a pair of carriage structures mounted on said support members for reciprocatory movement with respect to one another in a common horizontal plane, a motor mounted on said frame, means connected to said motor and said carriage structures for imparting reciprocatory movement to each carriage structure, a pair of cutting blade holders assembled one upon the other for reciprocatory movement with respect to one another, each of said blade holders being detachably connected to a carriage structure, cutting blades affixed to said holders for receiving an item to be sliced, and means mounted on said frame and engageable with said item to urge same into engagement with said cutting blades upon the reciprocation of said blade holders, said cutting blade holders each including a pair of end members arranged in spaced relation to one another with one of the end members of one of said pair of end members being interposed between the end members of the other pair of end members, one of the members of each pair being provided with an upper edge or face that slopes or inclines inwardly from the outer edge towards the center portion of said end member and said inclined surfaces are formed with space parallel slots.

2. A slicing machine for fruits, vegetables and the like as set forth in claim 1 wherein said other of the end members of each pair is formed with a plurality of openings in alignment with the slots in said inclined surfaces, a cutting blade positioned in each slot and anchored therein with a rod attached to an end of each blade and extending through an opening in said other of the end members and means engaging said rods for adjusting the tension of said blades in said holders.

3. A slicing machine for fruits, vegetables and the like comprising a frame, a pair of support members mounted in said frame in spaced parallel relation to one another, a pair of carriage structures mounted on said support members for reciprocatory movement with respect to one another in a common horizontal plane, a motor mounted on said frame, means connected to said motor and said carriage structure for imparting reciprocatory movement to each carriage structure, a pair of cutting blade holders assembled one upon the other for reciprocatory movement with respect to one another, each of said blade holders being detachable connected to a carriage structure, cutting blades affixed to said holders for receiving an item to be sliced, and means mounted on said frame and engageable with said item to urge same into engagement with said cutting blades upon the reciprocation of said blade holders, said cutting blade holders each including a pair of end members arranged in spaced relation to one another with one of the end members of one of said pair of end members being interposed between the end members of the other pair of end members, a cutter blade guidance frame mounted upon said frame and provided with a pair of plate members arranged in spaced parallel arrangement to one another and interposed between the end members of said cutting blade holder, said plate members having spaced guide pins mounted on the upper edge thereof.

4. A slicing machine for fruits, vegetables and the like as set forth in claim 3 wherein a pair of actuating levers are pivotly mounted on said frame for movement towards said cutting blade holders, a plurality of spaced elements carried by said levers for movement between said plate members and said cutting blades while acting as guides for said blades in conjunction with said guide pins.

* * * * *